(12) United States Patent
Liu et al.

(10) Patent No.: US 7,410,525 B1
(45) Date of Patent: Aug. 12, 2008

(54) MIXED MATRIX MEMBRANES INCORPORATING MICROPOROUS POLYMERS AS FILLERS

(75) Inventors: Chunqing Liu, Schaumburg, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 221 days.

(21) Appl. No.: 11/224,181

(22) Filed: Sep. 12, 2005

(51) Int. Cl.
| | |
|---|---|
| B01D 53/22 | (2006.01) |
| B01D 39/00 | (2006.01) |
| B01D 39/14 | (2006.01) |
| C02F 1/50 | (2006.01) |
| B32B 3/26 | (2006.01) |

(52) U.S. Cl. ............... 95/45; 210/500.27; 210/500.36; 210/502.1; 428/314.8

(58) Field of Classification Search ............ 428/314.8, 428/500.8, 500.27, 500.36, 502.1; 95/45; 96/14; 210/500.8, 500.27, 500.36, 502.1
See application file for complete search history.

(56) References Cited

U.S. PATENT DOCUMENTS

| | | | | |
|---|---|---|---|---|
| 6,508,860 | B1 * | 1/2003 | Kulkarni et al. ............... | 95/51 |
| 7,166,146 | B2 * | 1/2007 | Miller et al. ............... | 95/45 |
| 2005/0230305 | A1 * | 10/2005 | Kulkarni et al. ............... | 210/500.23 |
| 2006/0201884 | A1 * | 9/2006 | Kulprathipanja et al. ..... | 210/651 |
| 2006/0246273 | A1 * | 11/2006 | McKeown et al. ........ | 428/314.8 |

FOREIGN PATENT DOCUMENTS

| | | | |
|---|---|---|---|
| WO | WO 98/14509 | * | 2/1997 |
| WO | WO 97/03748 | * | 4/1998 |
| WO | WO 2005/012397 A2 | | 2/2005 |

OTHER PUBLICATIONS

J. Hradil, V. Krystl, P. Hrabanek, B. Bernauer, M. Kocirik, "Heterogeneous membranes based on polymeric adsorbents for separtion of small molecules", Jun. 24, 2004, Sceince Direct, pp. 303-313.*
Hradil et al, "Heterogenous membranes based on polymeric adsorbents for separation of small molecules", Apr. 1, 2003, Science Direct.*
"Phthalocyanine-Based Nanoporous Network Polymers" by N.B. McKeown et al., Chem. Commun., 2002, 2780-2781.
"Porphyrin-Based Nanoporous Network Polymers" by N.B. McKeown et al., Chem. Commun., 2002, 2782-2783.
"A Nanoporous Network Polymer Derived from Hexaazatrinaphthylene with Potential as an Adsorbent and Catalyst Support" by P.M. Budd et al., J. Mater. Chem., 2003, 13, 2721-2726.
"Polymers of Intrinsic Microporosity (PIMs): Robust, Solution-Processable, Organic Nanoporous Materials" by P.M. Budd et al., Chem. Commun., 2004, 230-231.
"Solution-Processed, Organophilic Membrane Derived from a Polymer of Intrinsic Microporosity" by P.M. Budd et al., Adv. Mater. 2004, 16, No. 5, March 5.
"Polymers of Intrinsic Microporosity (PIMs): Bridging the Void Between Microporous and Polymeric Materials" by N.B. McKeown et al., Chem. Eur. J. 2005, 11, 2610-2620.
"Microporous Polymeric Materials" by P.M. Budd et al., Materials Today, Apr. 2004, 40-46.

* cited by examiner

Primary Examiner—Walter D. Griffin
Assistant Examiner—Amber Miller Harris
(74) Attorney, Agent, or Firm—Mark Goldberg

(57) ABSTRACT

The present invention is for a polymer/polymer mixed matrix membrane and the use of such membranes in gas separation applications. More specifically, the invention involves the preparation of polymer/polymer mixed matrix membranes incorporating soluble polymers of intrinsic microporosity as microporous fillers. These polymeric fillers of intrinsic microporosity exhibit behavior analogous to that of conventional microporous materials including large and accessible surface areas, interconnected micropores of less than 2 nm in size, as well as high chemical and thermal stability, but, in addition, possess properties of conventional polymers including good solubility and easy processability. Gas separation experiments on these mixed matrix membranes show dramatically enhanced gas separation performance for $CO_2$ removal from natural gas. Mixed matrix membranes prepared in accordance with the present invention can also be used in the separation of the following pairs of gases: hydrogen/methane, carbon dioxide/nitrogen, methane/nitrogen and olefin/paraffin such as propylene/propane.

28 Claims, No Drawings

US 7,410,525 B1

MIXED MATRIX MEMBRANES INCORPORATING MICROPOROUS POLYMERS AS FILLERS

FIELD OF THE INVENTION

This invention pertains to mixed matrix membranes having greatly improved performance in separation of gases. More particularly, the invention pertains to improved mixed matrix membranes containing high surface area microporous polymers.

BACKGROUND OF THE INVENTION

In the past 30-35 years, polymer membrane-based gas separation processes have evolved rapidly. Membrane gas separation is of special interest to petroleum producers and refiners, chemical companies, and industrial gas suppliers. Several applications have achieved commercial success, including $CO_2$ removal from natural gas and from biogas and enhanced oil recovery. For example, UOP's Separex® membrane is currently an international market leader for $CO_2$ removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that each component is sorbed by the membrane at one interface, transported by diffusion across the membrane through the voids between the polymeric chains (free volume), and desorbed at the opposing interface. According to this solution-diffusion model, the membrane performance in separating a given pair of gases (e.g., $CO_2/CH_4$, $O_2/N_2$, $H_2/CH_4$) is determined by two parameters: the permeability coefficient ($P_A$) and the selectivity ($\alpha_{A/B}$). The $P_A$ is the product of the gas flux and the membrane thickness, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or both coefficients. In general, the diffusion coefficient decreases while the solubility coefficient increases with an increase in the molecular size of the gas. For high-performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, high permeability, good mechanical stability, and ease of processability that are important for gas separation. A polymer material with a high glass-transition temperature (Tg), high melting point, and high crystallinity is preferred. Glassy polymers (i.e., polymers at temperatures below their Tg) have stiffer polymer backbones and therefore let smaller molecules such as hydrogen and helium pass through more quickly, while larger molecules such as hydrocarbons pass through more slowly than polymers with less stiff backbones. However, polymers which are more permeable are generally less selective than are less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success.

Cellulose acetate (CA) glassy polymer membranes are used extensively in gas separation. Currently, such CA membranes are used for natural gas upgrading, including removal of carbon dioxide. Although CA membranes have many advantages, they are limited in a number of properties including selectivity, permeability, chemical, thermal, and mechanical stability. One of the immediate challenges that needs to be addressed in CA polymer membranes is achieving higher selectivity with equal or greater permeability.

In order to enhance membrane selectivity and permeability, a new type of membranes, mixed matrix membranes (MMMs) have recently been developed. Almost all of the MMMs reported to date in the literature are hybrid blend membranes comprising insoluble solid domains such as molecular sieves or carbon molecular sieves embedded in a polymer matrix. They combine the low cost and easy processability of the polymer phase with the superior gas separation properties of the molecular sieve phase. These membranes have the potential to achieve higher selectivity with equal or greater permeability compared to existing polymer membranes, while maintaining their advantages. In contrast to the many studies on conventional polymers for membranes, only a few attempts to increase gas separation membrane performance with mixed matrix membranes of zeolite and rubbery or glassy polymers have been reported.

Most recently, McKeown et al. reported the synthesis of new polymers that are described as being of intrinsic microporosity, bridging the void between microporous and polymeric materials. These polymers can exhibit behavior analogous to that of conventional microporous materials, but, in addition, can be readily processed into convenient forms for use as membranes. Pure polymer membranes were prepared directly from some of these polymers possessing intrinsic microporosity and $O_2$ over $N_2$ gas separation performance has been evaluated. See WO 2005/012397 A2. These polymers of intrinsic microporosity, however, have never been studied as soluble microporous fillers for the preparation of mixed matrix membranes.

SUMMARY OF THE INVENTION

The present invention describes a novel polymer/polymer mixed matrix membrane and the use of such membranes in gas separation applications. More specifically, the invention involves the preparation of polymer/polymer MMMs incorporating soluble polymers of intrinsic microporosity as microporous fillers. In this invention, new types of polymer/polymer MMMs containing polymers of intrinsic microporosity as fillers have been prepared. In these polymer/polymer MMMs soluble polymeric fillers possessing intrinsic microporosity are incorporated into a continuous polymer matrix. The polymeric fillers exhibit a rigid rod-like, randomly contorted structure which allows them to exhibit intrinsic microporosity. These polymeric fillers of intrinsic microporosity exhibit behavior analogous to that of conventional microporous materials including large and accessible surface areas, interconnected micropores of less than 2 nm in size, as well as high chemical and thermal stability, but, in addition, possess properties of conventional polymers including good solubility and easy processability. Moreover, those polymeric fillers that possess polyether polymer chains have favorable interaction between carbon dioxide and the ethers within the chain. These polymeric fillers were found to reduce the hydrocarbon fouling problem of polyimide membranes. The solubility of the microporous polymeric fillers offers significant advantages over conventional insoluble microporous materials in the preparation of MMMs. The polymer matrix can be selected from all kinds of glassy polymers such as polyimides (e.g., Matrimid®), polyetherimides (e.g., Ultem®), cellulose acetates, polysulfones, and polyethersulfones. These polymer/polymer MMMs combine the properties of both the continuous polymer matrix and the dispersed polymeric fillers. Gas separation experiments on these MMMs show dramatically enhanced gas separation performance for $CO_2$ removal from natural gas. Mixed matrix membranes prepared in accordance with the present invention can also be used in the separation of the following pairs of gases: hydrogen/methane, carbon dioxide/nitrogen, methane/nitrogen and olefin/paraffin such as propylene/propane.

DETAILED DESCRIPTION OF THE INVENTION

Mixed matrix membranes (MMMs) containing microporous solid materials as fillers may retain polymer processability and improve selectivity for gas separation due to the superior molecular sieving and sorption properties of the microporous materials. These MMMs have received world-wide attention during the last two decades. For most cases, however, high solid loading is required to obtain substantial enhancement of gas separation properties. High solid loading, however, results in poor mechanical and processing properties mainly because of the aggregation of the solid particles in the polymer matrix and the poor adhesion between the inorganic solid particles and the organic polymer matrix. The membranes of the present invention are especially useful in the purification, separation or adsorption of a particular species in the liquid or gas phase. In addition to separation of pairs of gases, these membranes may, for example, be used for the separation of proteins or other thermally unstable compounds, e.g. in the pharmaceutical and biotechnology industries. The membranes may also be used in fermenters and bioreactors to transport gases into the reaction vessel and transfer cell culture medium out of the vessel. Additionally, the membranes may be used for the removal of microorganisms from air or water streams, water purification, ethanol production in a continuous fermentation/membrane pervaporation system, and in detection or removal of trace compounds or metal salts in air or water streams.

The membranes are especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these membranes may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The membranes may incorporate a species that adsorbs strongly to certain gases (e.g. cobalt porphyrins or phthalocyanines for $O_2$ or silver(I) for ethane) to facilitate their transport across the membrane.

These membranes may also be used in the separation of liquid mixtures by pervaporation, such as in the removal of organic, compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Further liquid phase examples include the separation of one organic component from another organic component, e.g. to separate isomers of organic compounds. Mixtures of organic compounds which may be separated using an inventive membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The membranes may be used for gas separation. Examples of such separation include separation of an organic gas from an atmospheric gas, such as nitrogen or oxygen. A further example of such a separation is for the separation of organic gases from each other.

The membranes may be used for separation of organic molecules from water (e.g. ethanol and/or phenol from water by pervaporation) and removal of metal and other organic compounds from water.

An additional application for the membranes is in chemical reactors to enhance the yield of equilibrium-limited reactions by selective removal of a specific product in an analogous fashion to the use of hydrophilic membranes to enhance esterification yield by the removal of water.

The present invention pertains to polymer/polymer mixed matrix membrane (MMM) (or polymer/polymer mixed matrix film) containing soluble polymers of intrinsic microporosity as fillers. The solubility of the microporous polymeric fillers offers significant advantages over the use of conventional insoluble microporous materials in the preparation of MMMs. These new MMMs have immediate applications for the separation of gas mixtures including carbon dioxide removal from natural gas. The mixed matrix membrane permits carbon dioxide to diffuse through at a faster rate than the methane in the natural gas. Carbon dioxide has higher permeation rate than methane because of higher solubility, higher diffusivity, or both. Thus, carbon dioxide enriches on the permeate side of the membrane, and methane enriches on the feed (or reject) side of the membrane.

Any given pair of gases that differ in size, for example nitrogen and oxygen, carbon dioxide and methane, hydrogen and methane or carbon monoxide, helium and methane, can be separated using the mixed matrix membranes described herein. More than two gases can be removed from a third gas. For example, some of the components which can be selectively removed from a raw natural gas using the membranes described herein include carbon dioxide, oxygen, nitrogen, water vapor, hydrogen sulfide, helium, and other trace gases. Some of the components that can be selectively retained include hydrocarbon gases.

The polymer/polymer mixed matrix membranes developed in this invention are homogeneous organic-organic membranes comprising homogeneously distributed organic microporous polymer fillers throughout a continuous polymer phase. Preferably, the organic microporous polymer fillers incorporated into the polymer matrix possess intrinsic microporosity. More preferably, the organic microporous polymer fillers incorporated into the polymer matrix are soluble in the same solvent as that used for dissolving the polymer matrix, so that aggregation and poor adhesion problems are prevented. The resulting polymer/polymer mixed matrix membrane has a steady state permeability differ from that of the pure polymer due to the combination of the molecular sieving gas separation mechanism of the microporous polymer filler phase with the solution-diffusion gas separation mechanism of both the polymer matrix phase and the microporous polymer filler phase.

Design of the polymer/polymer mixed matrix membranes containing the microporous organic polymer fillers described herein is critically based on the proper selection of both microporous organic polymer filler and the continuous polymer matrix. Materials selection for both microporous organic polymer filler and the continuous polymer matrix is a key aspect for the preparation of these polymer/polymer mixed matrix membranes. Polymers provide a wide range of properties important for separations, and modifying them can improve membrane selectivity. A material with a high glass transition temperature (Tg), high melting point, and high crystallinity is preferred for most gas separations. Glassy polymers (i.e., polymers below their Tg) have stiffer polymer backbones and therefore let smaller molecules such as hydrogen and helium permeate the membrane more quickly and larger molecules such as hydrocarbons permeate the membrane more slowly.

For polymer/polymer mixed matrix membrane applications, it is preferred that the membrane fabricated from the pure polymer, which can be used as the continuous polymer phase in the mixed matrix membranes, exhibits a carbon dioxide or hydrogen over methane selectivity of at least about 15, more preferably at least about 30. Preferably, the polymer used as the continuous polymer phase in the polymer/polymer mixed matrix membrane is a rigid, glassy polymer.

Typical polymers suitable for polymer/polymer mixed matrix membrane preparation as the continuous polymer phase can be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose, etc.; polyimides, polyetherimides, and polyamides, including aryl polyamides, aryl polyimides such as Matrimid® 5218 and aryl polyetherimides such as Ultem® 1000; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly (phenylene terephthalate), etc.; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly (vinyl sulfates); polyallyls; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The microporous polymer fillers are selected to enhance the membrane properties. Microporous materials are defined as solids that contain interconnected pores of less than 2 nm in size and consequently, they possess large and accessible surface areas-typically 300-1500 $m^2g^{-1}$ as measured by gas adsorption. The discrete porosity provides molecular sieving properties to these materials which have found wide applications as catalysts and sorption media.

Microporous polymer materials (or as so-called "polymers of intrinsic microporosity") described herein are polymeric materials that possess microporosity that is intrinsic to their molecular structures. See McKeown, et al., Chem. Commun., 2780 (2002); McKeown, et al., Chem. Commun., 2782 (2002); Budd, et al., J. Mater. Chem., 13:2721 (2003); Budd, et al., Chem. Commun., 230 (2004); Budd, et al., Adv. Mater., 16:456 (2004); McKeown, et al., Chem. Eur. J., 11:2610 (2005); and Budd et al., MATERIALS TODAY, April 2004, pp. 40-46. The polymeric fillers have rigid rod-like, randomly contorted structure to generate intrinsic microporosity. These polymeric fillers of intrinsic microporosity exhibit analogous behavior to that of conventional microporous materials such as large and accessible surface areas, interconnected intrinsic micropores of less than 2 nm in size, as well as high chemical and thermal stability, but, in addition, possess properties of conventional polymers such as good solubility and easy processability. Moreover, these polymeric fillers possess polyether polymer chains that have favorable interaction between carbon dioxide and the ethers. These polymeric fillers also can reduce the hydrocarbon fouling problem of the polyimide membranes. The solubility of the microporous polymeric fillers offers significant advantages over conventional insoluble microporous materials in the preparation of MMMs. These microporous polymer materials are selected as the fillers in the preparation of polymer/polymer mixed matrix membranes. Representative examples of microporous polymer materials described herein as fillers are shown below (PIMs) followed by (network-PIMs).

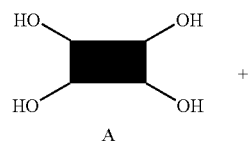
A
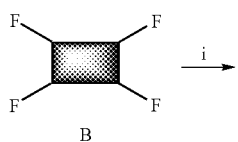
B
→ i
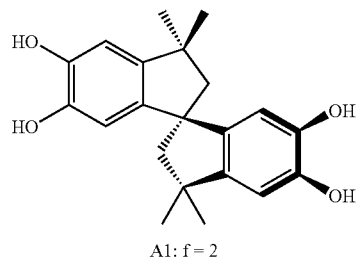
A1: f = 2
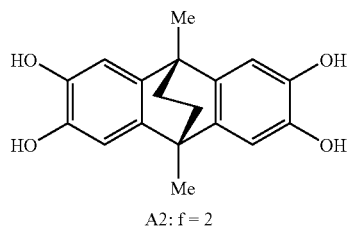
A2: f = 2
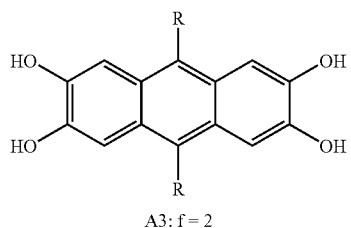
A3: f = 2
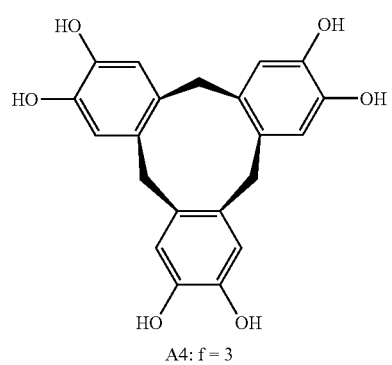
A4: f = 3
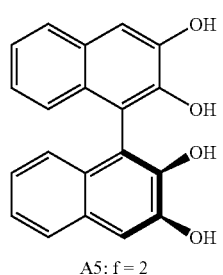
A5: f = 2
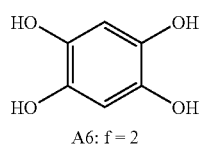
A6: f = 2
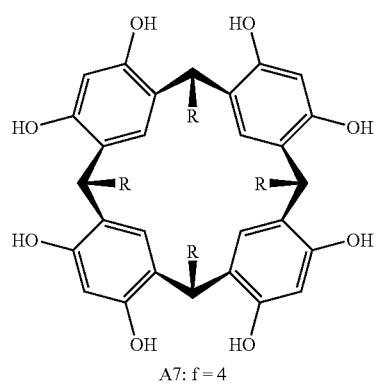
A7: f = 4

-continued
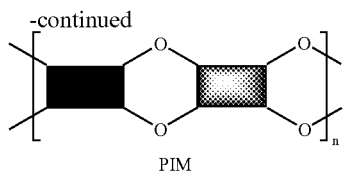
PIM
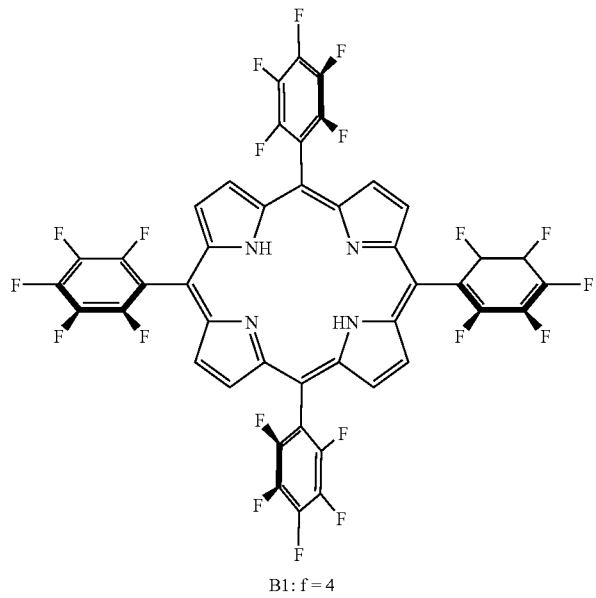
B1: f = 4
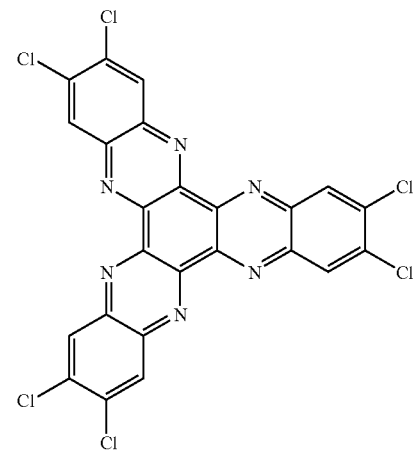
B2: f = 3
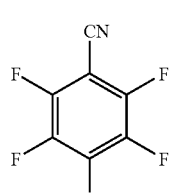
B4: f = 2
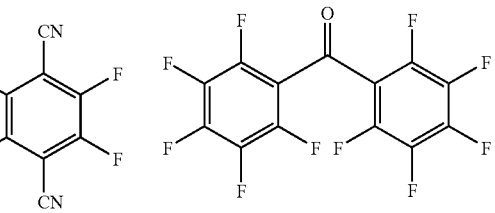
B5: f = 2
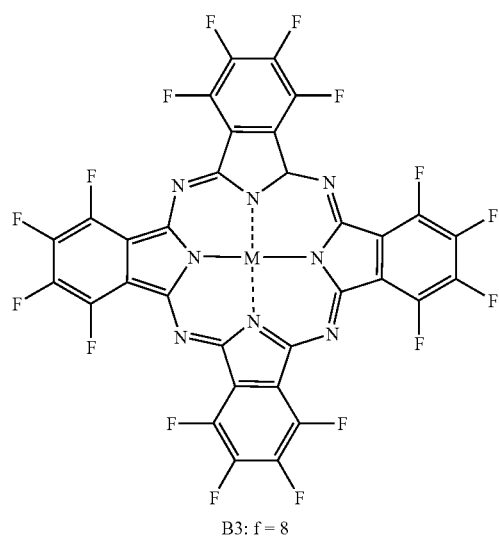
B3: f = 8
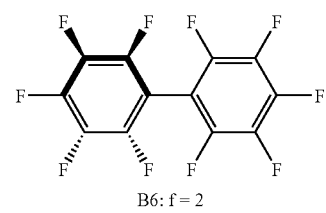
B6: f = 2
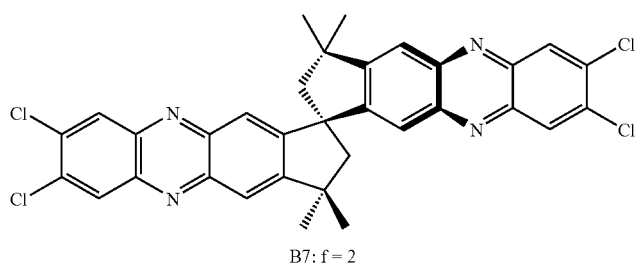
B7: f = 2

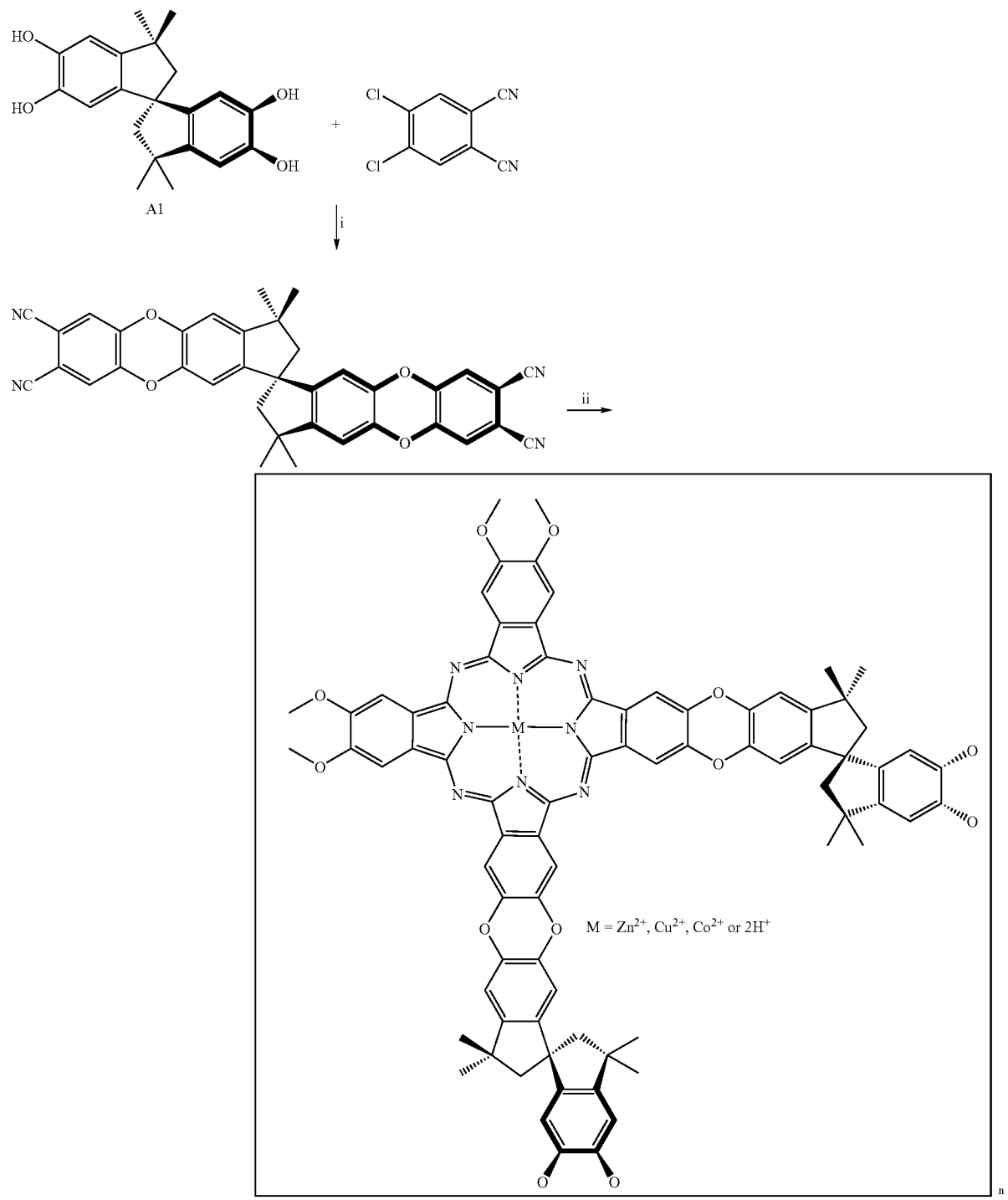

The dioxane formation (i.e., a double aromatic nucleophilic substitution) offers a general reaction for the preparation of PIMs from appropriate hydroxylated aromatic monomers (e.g., A1-A7) and fluorinated (or chlorinated) aromatic monomers (e.g., B1-B7) as shown in FIG. 1. The most preferred microporous polymer materials to be used as fillers with the present invention may be prepared according to the literature procedure. The synthesis of microporous polymer materials is well established in the literature.

For example, for the synthesis of PIM1 from monomers A1 and B4, efficient dibenzodioxane-forming reaction (i.e. aromatic nucleophilic substitution) between the aromatic tetrol monomer A1 with the appropriate fluorine-containing compound B4 gave soluble PIM1 (FIG. 1) with a high yield. PIM1 is freely soluble in organic solvents such methylene chloride, THF, DMAc. PIM1 was purified by repeated precipitation from THF solution into methanol and when collected by filtration give fluorescent yellow free-flowing powder.

The thermal stability of PIM1 was determined by thermal analysis, which indicates that PIM1 is thermally stable up to 370° C. The surface area and the pore size distribution of the microporous polymer fillers were characterized by nitrogen adsorption-desorption measurements which demonstrated that PIM1 is microporous with high surface area of 785 m$^2$g$^{-1}$. Micropore analysis using BJH method indicates a significant proportion of micropores had dimensions in the range of less than 1.5 nm. There is also evidence of some mesoporosity. The microporosity of the PIM1 arises from its high rigidity combined with a randomly contorted shape so that other polymers of high rigidity with a randomly contorted shape are useful in the present invention.

Polymer/polymer mixed matrix membranes containing microporous polymer fillers were fabricated by mixing certain amount of microporous polymer fillers in a continuous polymer matrix. The most preferred polymer/polymer mixed matrix membranes used in this present invention were fabricated as follows. Polymer/polymer mixed matrix dense films were prepared from solution casting of a homogeneous solution of microporous polymer fillers and a continuous polymer matrix. The solvents that can be used for dissolving both microporous polymer fillers and the continuous polymer matrix include methylene chloride, THF, acetone, DMF, NMP, DMSO, and others known to those skilled in the art. The loading of the microporous polymer fillers in the mixed matrix dense films may vary from 1 to 50 wt-% depending upon the properties sought as well as the dispersibility of the particular microporous polymer filler in the particular continuous polymer.

Selected amounts of microporous polymer as fillers and polymer as matrix were added to an organic solvent. After stirring for 2 hours, both polymers dissolved completely in the solvent to form a transparent homogeneous solution. The polymer solutions with microporous polymer filler loading of 1, 10, 20, 30, 40, and 50 wt-% (based on weight of polymer matrix) were poured into glass rings on top of a clean glass plate, and dried at room temperature inside a plastic cover for at least 12 hours to obtain the final polymer/polymer mixed matrix dense films. The dense films were detached from the glass plate and dried at room temperature for 24 hours and then at 110° C. for at least 48 hours under vacuum. All the dense films are transparent and were around 1-3 mils thick.

The permeability (P) and selectivity ($\alpha_{CO2/CH4}$) of the polymer/polymer mixed matrix membranes with microporous polymer fillers (or mixed matrix dense films) were measured by pure gas measurements at 50° C. under about 100 psig pressure. For all gases tested (N$_2$, H$_2$, He, CO$_2$ and CH$_4$), the polymer/polymer mixed matrix dense films containing microporous polymer fillers offer dramatically enhanced P (orders of improvement) compared to that of pure polymer matrix. These results indicate that the intrinsic gas transport properties of the microporous polymer fillers and polymer matrix phase determine the effective extremely high P of the polymer/polymer mixed matrix dense films. For example, as shown in the following table, the P$_{CO2}$ of 30%-PIM1-Matrimid mixed matrix dense film with 30 wt-% of microporous polymer PIM1 (35.9 barrer) increased 259% over that of pure Matrimid dense film (10.0 barrer), and in the meantime the $\alpha_{CO2/CH4}$ (24.8) only slightly decreased (<13% decrease) compared to that of Matrimid dense film (28.2). These gas separation results indicate a 2-3 order of magnitude increase in permeability than that of a pure continuous Matrimid polymer with equal or slightly lower CO$_2$ over CH$_4$ selectivity; about 3 orders of magnitude higher permeability than that of cellulose acetate polymer, suggesting immediate gas separation applications such as CO$_2$ removal from natural gas.

In addition, the mechanical strength of the polymer/polymer mixed matrix dense films with 30 wt-% microporous polymer filler loading is nearly the same as that of the pure polymer matrix. No phase separation is observed with up to 30 wt-% incorporation of the microporous polymer fillers into the continuous polymer matrix.

Mixed matrix membranes were prepared that exhibited the advantages of the addition of soluble polymers of intrinsic microporosity to continuous polymers. Ten to thirty percent by weight of the microporous fillers were added to Ultem polyetherimide and to Matrimid polyimide. The permeability and selectivity of the pure polymers used as well as the mixtures is shown in the following table:

| Gas separation results of polymer-polymer MMMs* | | | | |
|---|---|---|---|---|
| | Permeability (P, barrer) | | | |
| Film | P$_{CO2}$ | P$_{CO2}$ increased | P$_{CH4}$ | Selectivity ($\alpha_{CO2/CH4}$) |
| Pure Ultem 1000 | 1.95 | — | 0.0644 | 30.3 |
| 10%-PIM1-Ultem | 2.89 | 48% | 0.0915 | 31.6 |
| 20%-PIM1-Ultem | 5.69 | 192% | 0.182 | 31.2 |
| 30%-PIM1-Ultem | 5.77 | 196% | 0.191 | 30.2 |
| Pure PIM1 | 4791.8 | — | 589.6 | 8.13 |
| Pure Matrimid 5218 | 10.0 | — | 0.355 | 28.2 |
| 10%-PIM1-Matrimid | 20.3 | 103% | 0.749 | 27.1 |
| 20%-PIM1-Matrimid | 22.8 | 128% | 0.911 | 25.1 |
| 30%-PIM1-Matrimid | 35.9 | 259% | 1.45 | 24.8 |
| 6FDA-m-PDA | 14.8 | — | 0.306 | 48.4 |
| 7.5%-PIM1-6FDA-m-PDA | 22.3 | 51% | 0.457 | 48.7 |

*Testing conditions: Pure gas permeation, 50° C., ~100 psig.

The permeability (P) and ideal selectivity ($\alpha_{CO2/CH4}$) of the polymer-polymer MMMs with PIM fillers were measured by pure gas measurements at 50° C. under ~100 psig pressure. As shown in Table 1, the PIM1-Ultem MMMs containing PIM1 as fillers offer dramatically enhanced P$_{CO2}$ (orders of improvement) without loss of $\alpha_{CO2/CH4}$ compared to that of the pure Ultem polymer matrix (FIG. 1). For the PIM1-Matrimid MMMs containing PIM1 as fillers, pure gas permeation tests show doubled or tripled P$_{CO2}$ and slightly decreased $\alpha_{CO2/CH4}$ (<13% decrease) compared to the intrinsic P$_{CO2}$ and $\alpha_{CO2/CH4}$ of the pure Matrimid polymer matrix.

These results indicate that the intrinsic gas transport properties of the PIM fillers and polymer matrix phase determine the effective extremely high P$_{CO2}$ of the polymer-polymer MMMs. For example, as shown in Table 1, the P$_{CO2}$ of 20%-PIM1-Ultem MMM with 20 wt % of microporous polymer PIM1 increased 190% over that of pure Ultem dense film, and in the meantime the $\alpha_{CO2/CH4}$ remained as high as that of pure Ultem dense film.

Pure gas permeation experiments on the Ultem- or Matrimid-based polymer-polymer MMMs show more than doubled P$_{CO2}$ compared to that of the corresponding pure continuous polymer matrix with equal or slightly decreased $\alpha_{CO2/CH4}$, suggesting promising application for CO$_2$ removal from natural gas.

Mixed matrix membranes prepared in accordance with the present invention can also be used in the separation of the following pairs of gases: hydrogen/methane, carbon dioxide/nitrogen, methane/nitrogen and olefin/paraffin such as propylene/propane.

What is claimed is:

1. A process for separating at least one gas from a mixture of gases, the process comprising:
   a) providing a mixed matrix gas separation membrane comprising a soluble polymer of intrinsic microporosity dispersed in a continuous phase consisting essentially of a second soluble polymer that does not exhibit microporosity which is permeable to said at least one gas wherein said second soluble polymer has a selectivity higher than said soluble polymer of intrinsic microporosity;
   b) contacting the mixture on one side of the mixed matrix membrane to cause said at least one gas to permeate the mixed matrix membrane; and
   c) removing from the opposite side of the membrane a permeate gas composition comprising a portion of said at least one gas which permeated said membrane.

2. The process of claim 1 wherein said soluble polymer of intrinsic microporosity consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation.

3. The process of claim 2 wherein said point of contortion is provided by a substituted or unsubstituted spiro-indane, bicyclo-octane, biphenyl or binaphthyl moiety.

4. The process of claim 2 wherein each of the first planar species comprises at least one aromatic ring.

5. The process of claim 2 wherein each of the first planar species comprises a substituted or unsubstituted moiety of the formula:

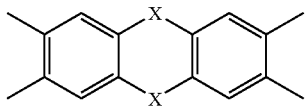

where X is O, S or NH.

6. The process of claim 2 wherein soluble polymer of intrinsic microporosity comprises repeating units of formula:

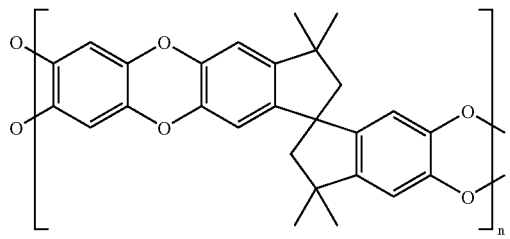

which may be substituted or unsubstituted.

7. The process of claim 2 wherein the soluble polymer of intrinsic microporosity comprises repeating units of formula:

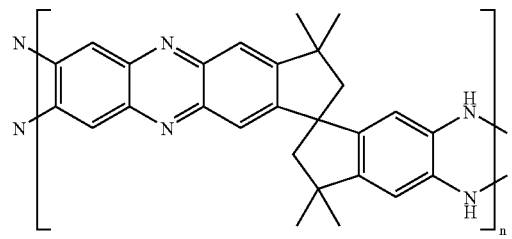

which may be substituted or unsubstituted.

8. The process of claim 1 wherein the soluble polymer of intrinsic microporosity comprises repeating units of formula:

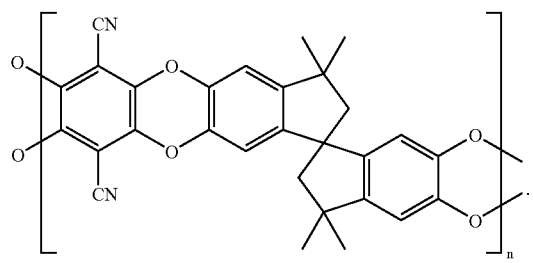

9. The process of claim 1 wherein said second soluble polymer continuous phase comprises one or more polymers selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly(arylene oxides); poly(esteramide-diisocyanate); polyurethanes; polyesters, polysulfides; poly (ethylene), poly(propylene), poly(butene-1), poly (4-methyl pentene-1), polyvinyls, polyallyls; poly (benzobenzimidazole); polyhydrazides; polyoxadiazoles; polytriazoles; poly (benzimidazole); polycarbodiimides; polyphosphazines; etc., and interpolymers, including block interpolymers containing repeating units from the above polymers.

10. The process of claim 1 wherein said mixture of gases comprises a pair of gases selected from the group consisting of hydrogen/methane, carbon dioxide/nitrogen, methane/nitrogen and olefin/paraffin.

11. A homogeneous mixed matrix membrane comprising a soluble polymer of intrinsic microporosity and a soluble polymer that does not exhibit microporosity wherein said soluble polymer exhibits higher selectivity than said soluble polymer of intrinsic microporosity.

12. The mixed matrix membrane of claim 11 wherein said soluble polymer of intrinsic microporosity consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation.

13. The mixed matrix membrane of claim 12 wherein the point of contortion is provided by a substituted or unsubstituted spiro-indane, bicyclo-octane, biphenyl or binaphthyl moiety.

14. The mixed matrix membrane of claim 12 wherein each of the first planar species comprises at least one aromatic ring.

15. The mixed matrix membrane of claim 12 wherein each of the first planar species comprises a substituted or unsubstituted moiety of the formula:

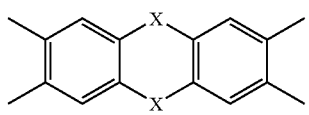

where X is O, S or NH.

16. The mixed matrix membrane of claim 12 wherein said soluble polymer of intrinsic microporosity comprises repeating units of formula:

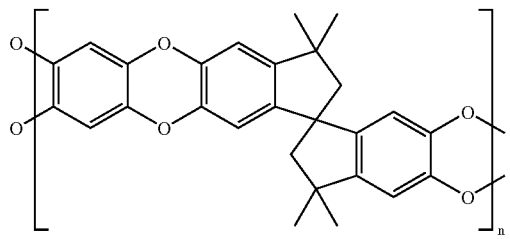

which may be substituted or unsubstituted.

17. The mixed matrix membrane of claim 11 wherein said soluble polymer of intrinsic microporosity comprises repeating units of formula:

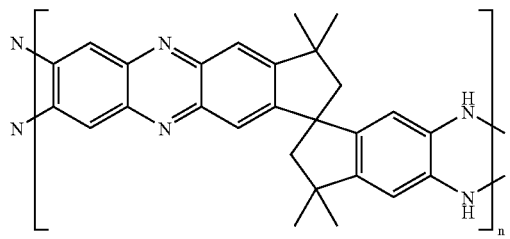

which may be substituted or unsubstituted.

18. The mixed matrix membrane of claim 11 wherein said soluble polymer of intrinsic microporosity comprises repeating units of formula:

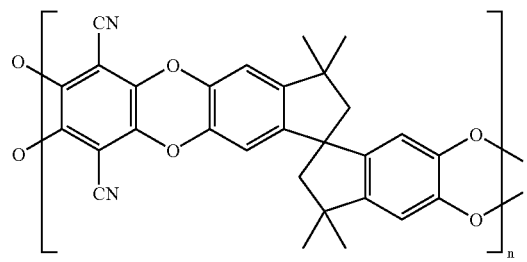

19. The mixed matrix membrane of claim 11 wherein said continuous phase comprises one or more polymers selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly(arylene oxides); poly(esteramide-diisocyanate); polyurethanes; polyesters, polysulfides; poly (ethylene), poly (propylene), poly(butene-1), poly(4-methyl pentene-1), polyvinyls, polyallyls; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above polymers.

20. A method of making a homogeneous mixed matrix membrane comprising:
providing a soluble continuous phase organic polymer;
providing small pore soluble polymers of intrinsic microporosity;
dispersing the soluble polymers of intrinsic microporosity into a solution containing the soluble continuous phase organic polymer; and
allowing the continuous phase organic polymer to solidify about the soluble polymers of intrinsic microporosity to produce a mixed matrix membrane wherein said soluble continuous phase organic polymer has a higher selectivity than said polymer of intrinsic microporosity.

21. The method of claim 20 wherein said continuous phase comprises one or more polymers selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly (arylene oxides); poly(esteramide-diisocyanate); polyurethanes; polyesters, polysulfides; poly (ethylene), poly(propylene), poly(butene-1), poly(4-methyl pentene-1), polyvinyls, polyallyls; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above polymers.

22. The method of claim 20 wherein said soluble polymer of intrinsic microporosity consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation.

23. The method of claim 22 wherein the point of contortion of is provided by a substituted or unsubstituted spiro-indane, bicyclo-octane, biphenyl or binaphthyl moiety.

24. The method of claim 22 wherein each of the first planar species comprises at least one aromatic ring.

25. The method of claim 22 wherein each of the first planar species comprises a substituted or unsubstituted moiety of the formula:

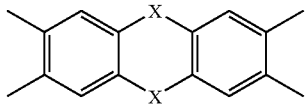

where X is O, S or NH.

26. The method of claim 22 wherein said soluble polymer of intrinsic microporosity comprises repeating units of formula:

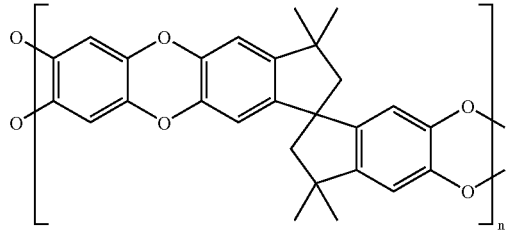

which may be substituted or unsubstituted.

27. The method of claim 22 wherein said soluble polymer of intrinsic microporosity comprises repeating units of formula:

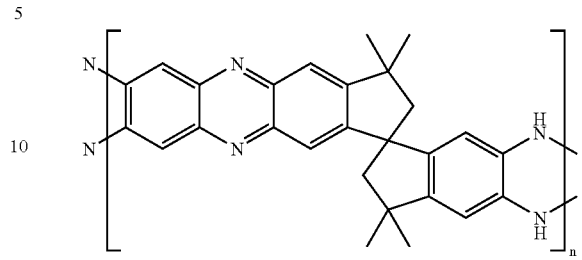

which may be substituted or unsubstituted.

28. The method of claim 22 wherein said soluble polymer of intrinsic microporosity comprises repeating units of formula:

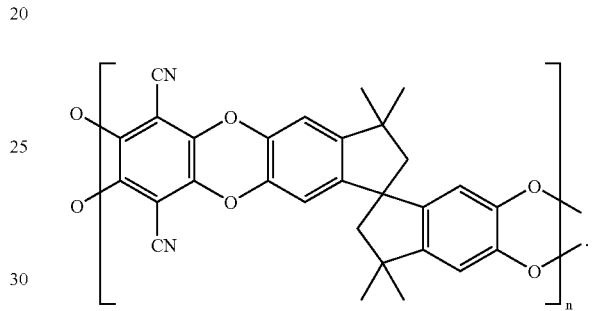

* * * * *

UNITED STATES PATENT AND TRADEMARK OFFICE
CERTIFICATE OF CORRECTION

| | |
|---|---|
| PATENT NO. | : 7,410,525 B1 |
| APPLICATION NO. | : 11/224181 |
| DATED | : August 12, 2008 |
| INVENTOR(S) | : Chunqing Liu et al. |

It is certified that error appears in the above-identified patent and that said Letters Patent is hereby corrected as shown below:

Column 16, line 54, replace
 "11. A homogeneous mixed matrix membrane comprising a soluble polymer ..."
with
 --11. A homogeneous mixed matrix membrane comprising a continuous phase soluble polymer ...--.

Signed and Sealed this

Twenty-third Day of December, 2008

JON W. DUDAS
*Director of the United States Patent and Trademark Office*